April 18, 1939.  E. J. YARTER  2,155,352
MEASURING INSTRUMENT
Filed Oct. 16, 1937  3 Sheets-Sheet 1
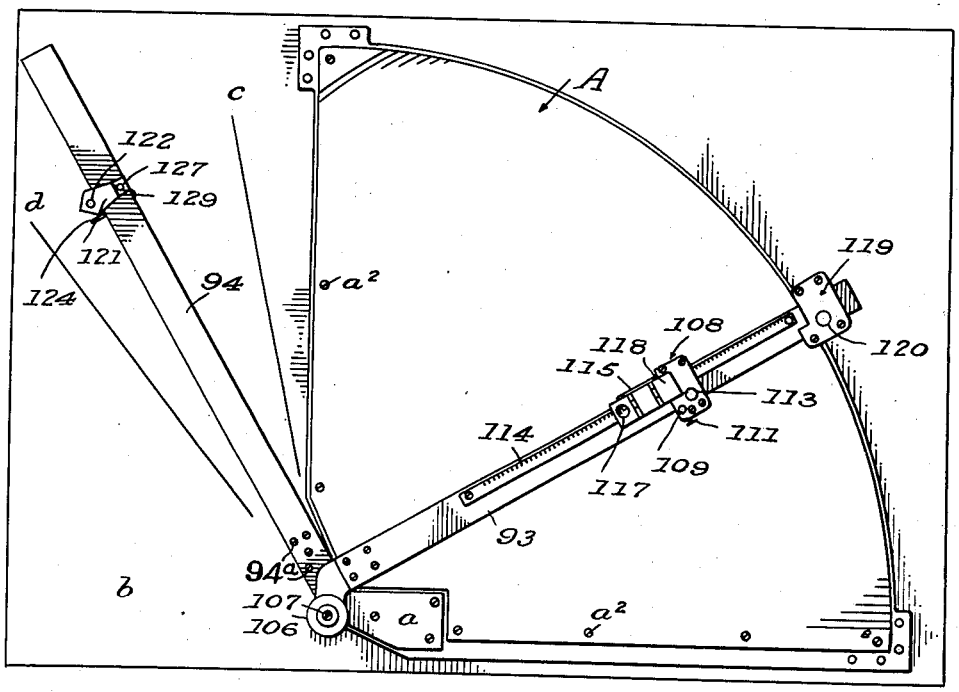
Fig. 1.
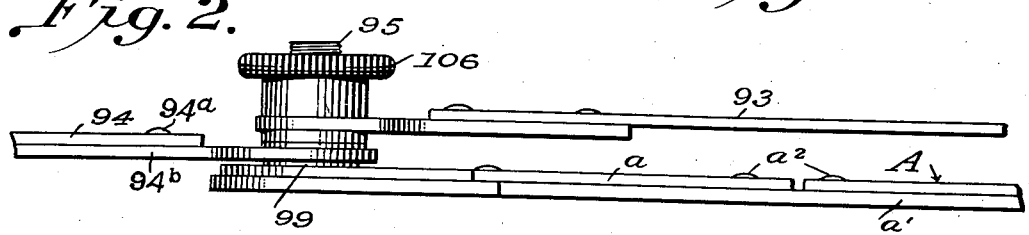
Fig. 2.
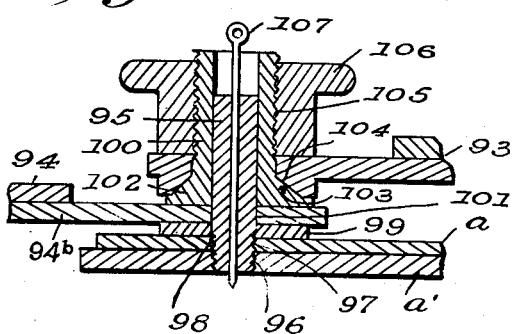
Fig. 3.
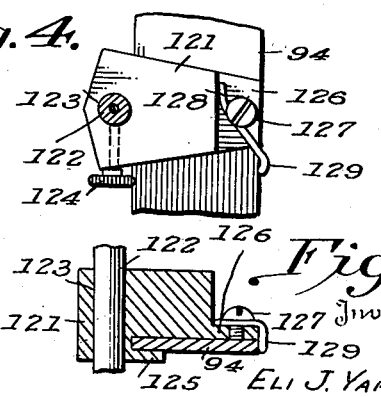
Fig. 4.
Fig. 5.
Inventor
Eli J. Yarter
Milans & Milans
Attorneys April 18, 1939.  E. J. YARTER  2,155,352
MEASURING INSTRUMENT
Filed Oct. 16, 1937  3 Sheets-Sheet 2
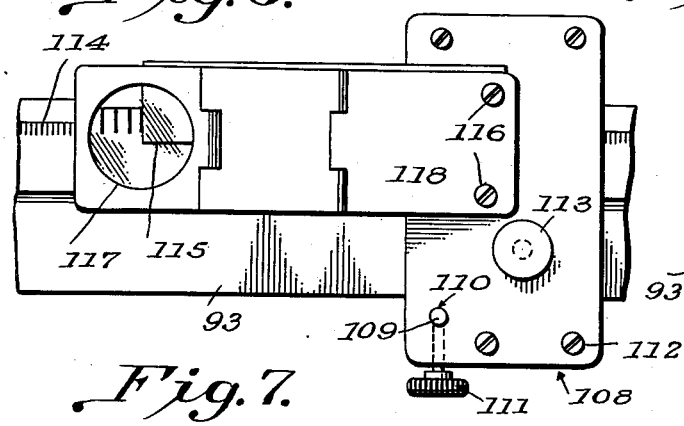
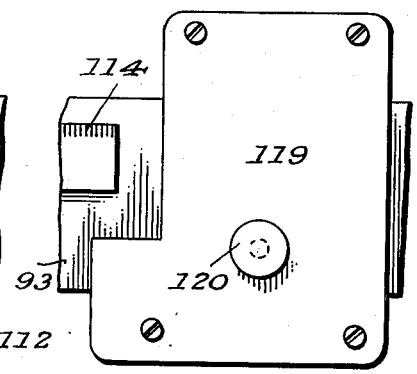
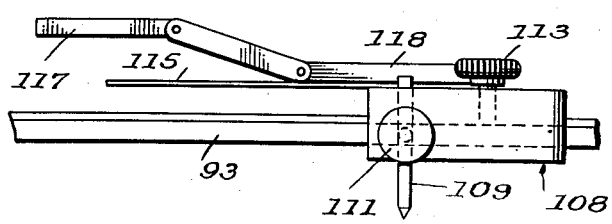
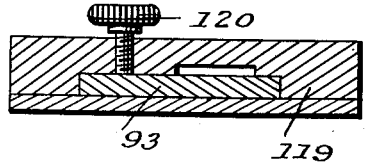
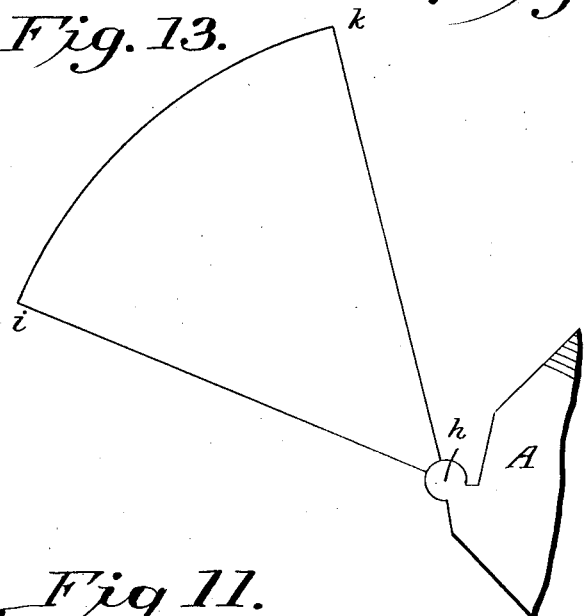
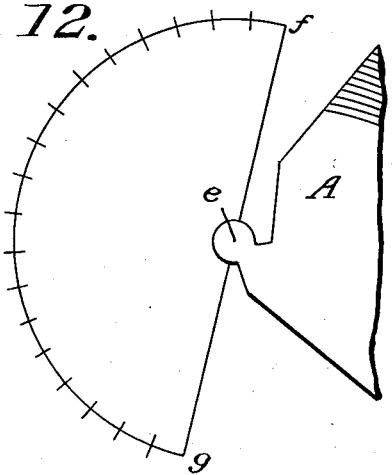
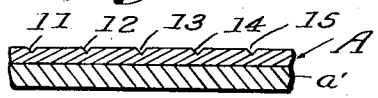
Inventor
ELI J. YARTER
By
Milans & Milans
Attorneys April 18, 1939. E. J. YARTER 2,155,352
MEASURING INSTRUMENT
Filed Oct. 16, 1937 3 Sheets-Sheet 3

Inventor
ELI J. YARTER

Milans & Milans
Attorneys

Patented Apr. 18, 1939

2,155,352

UNITED STATES PATENT OFFICE 2,155,352

MEASURING INSTRUMENT

Eli J. Yarter, Staten Island, N. Y.; Elizabeth Yarter administratrix of said Eli J. Yarter, deceased Application October 16, 1937, Serial No. 169,476

17 Claims. (Cl. 33—76)

This invention relates to an improved measuring instrument for measuring, constructing and dividing angles.

Objects of the invention are to provide an improved instrument of simple construction for the construction of angles of any given size; to provide for measuring any given angle; to provide for multisecting or dividing angles into equal parts, and for the performance of each of these operations rapidly and with extreme fineness.

The invention, with other objects and advantages thereof, and the particular construction, combination and arrangement of parts comprising the same, will be understood from the hereinafter contained detail description, when considered in connection with the accompanying drawings, forming part hereof and illustrating one embodiment of the invention.

In the drawings:

Figure 1 is a top plan view of a measuring instrument constructed in accordance with the present invention, the instrument being shown placed on a sheet of paper on which is indicated the legs of an angle.

Fig. 2 is a detail side elevation of the pivotal connections of the rule member and radius arm with the sector shaped plate.

Fig. 3 is a detail vertical section of the pivotal connections illustrated in Figure 2.

Fig. 4 is a detail top plan view of the rule slide.

Fig. 5 is a vertical transverse section of the rule slide.

Fig. 6 is a top plan view of the slide on the radius arm.

Fig. 7 is a side elevation of the slide on the radius arm.

Fig. 8 is a top plan view of the stop on the radius arm.

Fig. 9 is a vertical transverse section of the stop on the radius arm.

Fig. 11 is a vertical section of a portion of the sector shaped plate.

Fig. 12 is a diagrammatic view illustrating the measuring instrument in connection with an angle of 180° in making certain calculations and also in dividing the angle into equal parts.

Fig. 13 is a diagrammatic view illustrating the use of the measuring instrument in measuring an angle.

Figure 10:
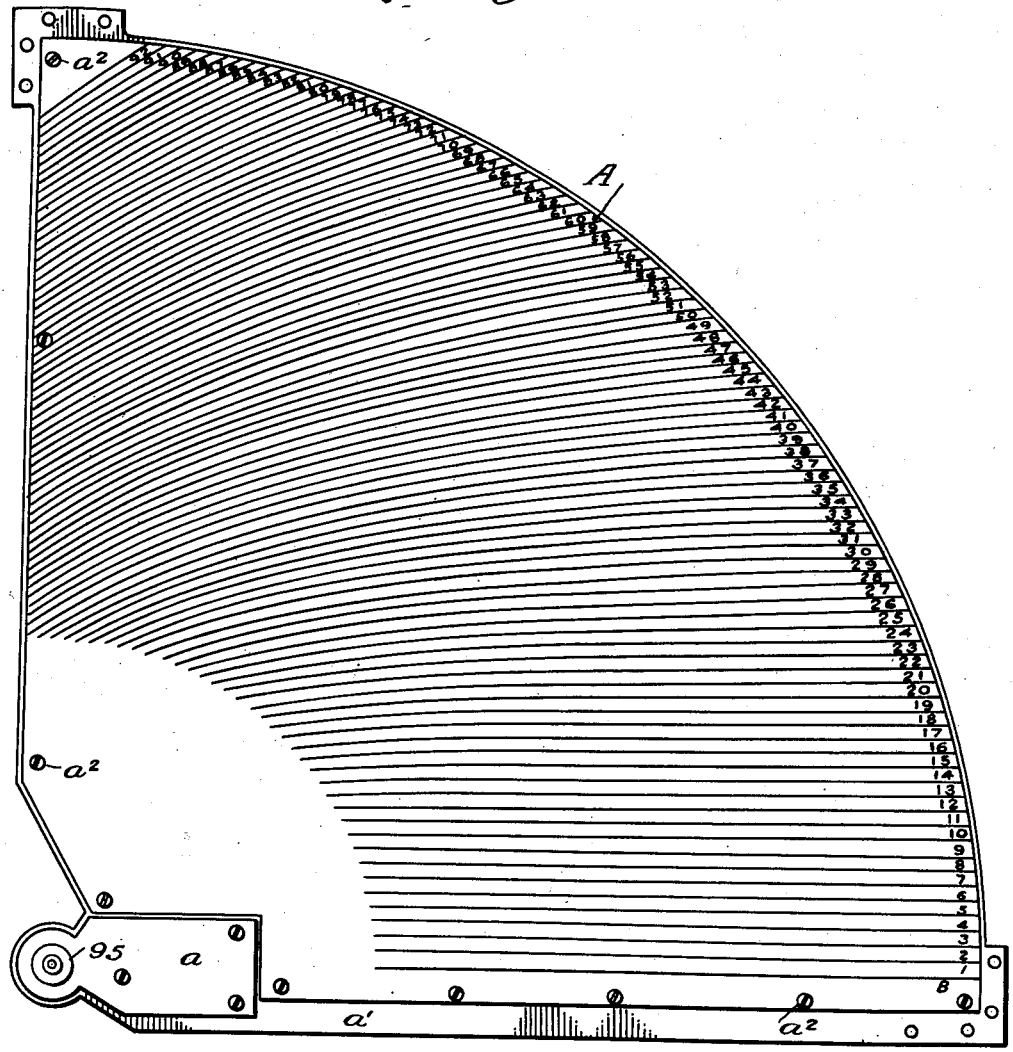
Fig. 10 is a top plan view, on a larger scale, of the sector shaped plate.

While a preferred embodiment of the invention is illustrated in the drawings, it will be understood that minor changes and modifications may be made in the particular construction shown, and the invention may be embodied in other forms as will appeal to those skilled in the art and falling within the scope of the appended claims, without departing from the spirit of the invention.

In the particular exemplification of the invention illustrated in the drawings, the fixed or constant chord length between the grooves is .2800708 or slightly over twenty-eight one hundredths ($28/100$) of one inch. In this connection, it is to be understood that in practicing the invention, the particular fixed or constant chord length referred to is not arbitrary but may vary as found desirable. It was simply selected in order to assure the final or greatest radius distance on the sector plate coming between 15 and 18 inches, and in this way effect a sizable spread of integral degrees for demonstration purposes. A shorter fixed chord length between the series of grooves might be preferred in some instances. This would permit a shorter radius of the sector plate, at the same time allowing sufficient size upon which to have at least 90 grooves.

Referring to a detailed description of the particular embodiment of the invention illustrated in the drawings, A designates a sector shaped plate. This plate, which is shown to be substantially a quadrant is provided with a series of curves and a straight line, all defined by grooves in the face of the plate, the first or base groove being designated B and the curved grooves being numbered consecutively 1 to 92. As shown in Figure 10 of the drawings, the straight base groove B extends radially of the plate, and the grooves are so formed as to be spaced from each other equal chord distances throughout all radius distances. The locus or path of groove 1 is generated by the upper end of a chord of fixed length moving outwardly from some point near the apex of the sector plate with its lower end terminating continuously in and moving along the base groove B. The locus of groove 2 is similarly formed or generated by the upper end of the chord moving outwardly from a point near the apex of the plate with its lower end terminating continuously in and moving along groove 1; and so on throughout the series of grooves, each groove being similarly derived from its predecessor. The grooves, as shown in Figure 11, are V-shaped in cross section.

Pivotally connected to the sector plate at the apex or central portion thereof to swing over the face of the same is a radius arm 93, the pivot of the radius arm being located so that the straight base groove B if prolonged would pass directly through the center thereof. A rule member or rod 94 is also pivotally connected with the sector plate to swing about the same pivotal axis as the radius arm 93. The pivotal connections of the radius arm 93 and the rule member or rod 94 with the sector plate, are provided by a stud 95 projecting upwardly from the steel plate portion a, said stud being shown with a threaded lower end portion 96 engaging threaded openings 97, 98 in the plate portion a and the metal base a'. 99 designates a washer or annular flange on the stud. The rule member of rod 94 is secured by screws 94ª to an arm 94ᵇ that is provided with a sleeve portion 100 to engage the stud 95, the sleeve portion 100 being fixed to the arm 94ᵇ adjoining an opening 101 therein. The radius arm 93 is provided with a tubular bearing portion 102 to fit on the sleeve portion 100 of the rule member or rod 94, said sleeve portion having a beveled portion 103 at its base and the tubular bearing portion 102 having a lower correspondingly beveled part 104. The sleeve portion 100 has a threaded portion 105 and engaging said threaded portion is a thumb nut 106. As will be understood, by turning up the nut tightly against the upper face of the tubular bearing portion 102 of the radius arm, the rule member or rod 94 can be clamped to the radius arm 93 for pivotal movement therewith, and when the nut is turned back or loosened, the radius arm and the rule member or rod are free to swing independently of each other.

The stud 95 is formed tubular to accommodate the needle member 107 the latter being adapted, as shown in Figure 3 of the drawings, to be inserted within the stud 95 from the top thereof to extend downwardly through the same and the metal base $a^2$, this construction providing means for readily positioning and maintaining the center of the pivots of the rule member or rod 94 and the radius arm 93 at the apex of an angle drawn on a sheet of paper as shown in Figure 1 of the drawings. In this view, b designates a sheet of paper bearing the legs c and d of an angle, the instrument being placed on the paper to one side of the angle with the needle member 107 engaged with the paper at the apex of the angle.

On the radius arm 93 is a longitudinally adjustable slide 108 provided with a needle 109 adapted to be engaged with and to slide in the series of grooves on the sector plate A. The needle 109 is secured in a socket 110 on the slide by a set screw 111 the needle projecting below the slide. The slide 108, which may be conveniently formed, as shown, in two sections secured together by screws 112, is provided with a set screw 113 adapted to be adjusted to engage the radius arm and hold the slide in different positions of adjustment along the same. A scale 114 is provided on the radius arm and 115 is a pointer on the slide 108 to cooperate with said scale, the pointer being shown in the form of a flat strip secured to the top of the slide by screws 116 and projecting to one side of the slide over the scale. 117 designates a lens carried by the slide and adapted to be adjusted as shown in Figure 6 of the drawings to extend over the scale 114 and the outer end of the pointer 115, the member 118 of the lens being secured to the slide over the pointer by the screws 116.

On the radius arm 93 is also a longitudinally adjustable stop 119 for the slide 108, the stop slidably engaging the radius arm and being provided with a set screw 120 to hold the same in adjusted position.

The rule member or rod 94 has a slide 121 provided with a marking element 122, this being shown as a pencil secured in a socket 123 on the slide by a set screw 124. The slide 121 has at one side a lip portion 125 that fits about one edge of the rule member or rod. At its other side, the slide has a reduced portion 126 and secured to this reduced portion by a screw 127 is a spring 128 one end portion 129 of the spring engaging one side edge of the rule, and the spring acting to yieldably hold the slide in different positions of adjustment along the rule.

The following are tables to be employed in the use of the instrument in measuring and constructing angles:

| (R) | (S) | (φ) |
|---|---|---|
| 16—04.5 | 26045 | 1.0000 |
| 16—01.6 | 26044 | 1.0028 |
| 16—00.0 | 26044 | 1.0044 |
| 15—63.9 | 25084 | 1.0045 |
| 15—62.7 | 25083 | 1.0056 |
| 15—59.8 | 25082 | 1.0084 |
| 15—56.9 | 25081 | 1.0112 |
| 15—45.3 | 25080 | 1.0227 |

In the tables, the figures in the column headed (R) are the slide settings. The figures in the column headed (φ) are the corresponding groove to groove angles, and the figures in the middle column headed (S) are the sum of the (R) and (φ) figures. These tables cover any angle and decimals thereof to the fourth decimal place from 0 degrees to 90 degrees. Given, or knowing any (R) figure, its corresponding (φ) figure is found by simply subtracting from the nearest (S) figure; likewise, if any (φ) figure is given or known, its corresponding (R) figure is found by subtracting from the (S) figure. Decimal points, dashes or hyphens of the figures are to be disregarded when subtracting. They are to be treated as though they were whole numbers, the decimal places being pointed off afterwards. The first two numerals of the (R) figures are inches, the next two sixty-fourths of an inch, and the last are tenths of sixty-fourths. In the (φ) figures, the first numeral is always 1 and the decimal point comes directly thereafter.

In compiling the foregoing tables, the correct slide setting on the radius arm for the construction of a perfect right angle involving 90 grooves, was first ascertained. Such a slide or needle setting produces a 1 degree angle in each groove to groove movement of the radius arm. This was done in the following way: The pivot of the instrument was first placed on a straight line by means of the pivot needle, the instrument being arranged relatively to a straight line approximately in the position illustrated diagrammatically in Figure 12 of the drawings.

The rule member 94 was then placed to coincide with the upper half e—f of the straight line, and the radius arm 93 along the groove B of the sector plate with the needle 109 contacting in groove B near the periphery of the sector plate. Then with the thumb nut 106 tightened, locking the rule to the radius arm for movement therewith, the radius arm was swung over the sector plate to bring the needle to rest in groove 90. This movement of course brought the rule to a position approximately perpendicular to the straight line. Holding the rule in this position, the thumb nut was loosened and the radius arm was swung back to bring the needle into engagement again with groove B. Then after tightening the thumb nut, the radius arm was again swung to engage the needle with groove 90, the rule being thus brought to a position nearly coincident with the lower half e—g of the straight line. After a few trial repetitions of this operation, with sundry corrections of the slide setting, the rule member was finally brought in perfect coincidence with the straight line, the 180 degree angle being accomplished with two movements of the radius arm from groove B to groove 90. In regard to the three major functions of the instrument namely, the measuring, constructing, and the multisection of angles, this slide setting is an important one, as it produces a 1 degree angle with each groove to groove movement of the radius arm. This slide setting is the first listed in the preceding tables and is 16—04.5, which means that the needle 109, as indicated by the scale 114 on the radius arm, is 16 inches and $$\frac{4.5}{64}$$

of an inch from the center of the pivot of the radius arm. This reading in the tables is

| (R) | (S) | (φ) |
|---|---|---|
| 16—04.5 | # | 1.0000 |

The stop 119 was then set against the slide and secured in this position by the set screw. Next, with the slide setting referred to, the radius arm was again moved to bring the needle to groove 90. While the radius arm was held in this position, the slide 108 was moved along the same in the direction of the radius arm pivot to bring the needle 109 into engagement with groove 89. With this latter setting a groove to groove movement of the radius arm, allowing the needle to contact each groove successively would divided a ninety degree angle into eighty-nine equal parts, producing with each movement an angle of $$\frac{90}{89}$$

degrees, or 1.0112φ. This slide setting was noted as

| (R) | (S) | (φ) |
|---|---|---|
| 15—56.9 | # | 1.01129 | the same being listed seventh in the preceding tables. Continuing in this manner until reaching groove 45, a set of slide readings was obtained enabling the construction of a right angle with the needle 109 in any groove from groove 45 to groove 90, and also the corresponding φ angles for the tables. It was found that the slide readings not only decreased as the φ figure readings increased, but that they changed in opposite value at nearly the same rate, and moreover in nearly the same amount. So nearly did these rates of change run to opposite values that when the two were added, the resulting sum remained constant for long intervals, and when it did change, it varied by but one unit (in the last place).

As will be understood, any angle may be constructed with the needle 109 of the slide contacting some point in the groove the number of which is the same as the integral part of the required angle. For instance, an angle say of one degree can be constructed with the needle contacting in groove 1 or any other angle of one degree and a decimal part, can also be constructed with the needle contacting groove 1, as for instance 1.9999 φ angle can be constructed with the needle in groove 1.

When the required angle is simply one degree the slide setting is at 16—04.5, or against the stop 119. As the required angle becomes greater, the slide must be moved on the radius arm toward the pivot but still may remain in groove 1. This is true of any angle whether expressed as an integer or with a decimal.

In the construction of angles with the instrument, the operation is as follows: Assuming that it is desired to construct an angle of 57.296 degrees. 57.296÷57=1.0052=the φ figure and referring to the preceding tables, it will be found that 1.0052 would come in between 1.0045 and 1.0056 if it were listed, and as it would come nearer the latter, it is subtracted from the (S) figure 25683, $$\begin{pmatrix}25683\\10052\\15631\end{pmatrix}$$

giving 15—63.1, the desired slide setting. Now that the slide setting and the groove number which is 57 is known, the slide 108 is set to 15—63.1 as indicated by the scale. The radius arm is then swung to contact the needle 109 in groove 57. The radius arm sweeps through an angle of 57.296 degrees, and with the thumb nut 106 tightened, the rule member is also swung through a like angle on the paper.

In using the instrument to measure angles, the pivots of the radius arm and needle member are placed over the apex of the angle as illustrated in Figure 13 of the drawings, the slide 108 is placed against the stop 119, the rule member is positioned coincident with the leg h—k of the angle and the thumb screw 106 is tightened to clamp the rule member to the radius arm. The radius arm is then swung over the sector plate until the rule member is brought in a position coincident with the leg h—i of the angle.

Holding the rule member in this position, the slide on the radius arm is moved toward the pivot of the radius arm until it contacts the first groove it comes to. This groove, in spanning this particular angle, was found to be groove 53, and a glance through the lens 117 showed the indicated slide setting on the scale to be 16—01.1. Referring to the preceding tables, the (S) figure corresponding to the slide setting 16—01.1 was found to be 26044. Then subtracting $$\begin{array}{r}26044\ (S)\\16011\ (R)\\\hline 1.0033=\phi\end{array}$$

and 53, the groove number, times 1.0033, the φ figure=531749 or 53.175 (to the third decimal place), the required angle.

In the operation of dividing or multisecting angles, the scale 114 and the tables are not used. Assuming that it is desired to divide an angle into thirteen equal parts. The instrument is placed on a sheet of paper with the apex needle 107 on the apex of the given angle, the sector plate being disposed as indicated in Figure 1 of the drawings so that the angle legs are visible. The radius arm is then positioned on the sector plate with the groove needle 109 resting in the groove B. Then with the thumb nut 106 loosened, the rule is swung to coincide with the upper leg of the angle. The thumb nut is then tightened and the radius arm swung over the sector plate until the rule is positioned coincident with the lower leg of the angle. The slide on the radius arm is then moved along the same until the needle 109 on the slide engages in any groove which is a multiple of 13. If groove number 26 is selected, then after clamping the slide in this position, the radius arm is swung letting the groove needle 109 contact every other or every second one of the grooves of the sector plate, which brings the rule to a stop at every thirteenth division of the angle. If groove number 39 should be selected instead of groove 26, then the radius arm is swung to permit the needle to contact every third groove, which gives the same results.

In Figure 12 of the drawings, a semi-circle or 180 degree angle is shown divided into nineteen equal parts. This will illustrate the operation of multisection when the angle is greater than ninety degrees and a repetition of the radius arm movement is required. The operation in instances of this kind is as follows: The nearest groove to groove number 90 which is a multiple of 19 is groove 76, so spanning one half of the angle and moving the slide to groove 76, then contacting the needle with every eighth groove, groove 8, 16, 24, etc., nine of the required 19 divisions are obtained. Then holding the rule member in its last position, the thumb nut is loosened, the radius arm brought back to contact the needle again with groove B. The thumb nut is then tightened and the radius arm is swung over the sector plate contacting the needle as before in every eighth groove. When groove number 72 is again reached, the movement of the radius arm is repeated one movement to groove 8 and in this way the nineteen divisions are obtained, the rule being finally brought coincident with the lower half e—g of the straight line.

It will be noted that by the particular construction and arrangement of parts hereinbefore set forth, an instrument is provided that is simple in construction, that is easily set or adjusted, and by which the measuring, construction, and multisection of angles can be performed quickly and with a very fine degree of accuracy. The instrument will easily measure, construct or divide to one one-thousandths of one degree without the aid of a vernier.

As shown in the drawings, Figure 10, the series of curved grooves and the straight base groove of the sector plate are discontinued a few inches from the apex or central portion of the plate. The grooves could terminate further from the apex of the plate as for any purpose only a little more than half the radius is ever required. The curved grooves of the sector plate are not circular arcs neither are they elliptic, parabolic, nor hyperbolic curves. They are not parallel, but approach parallelism and become parallel at infinity. They are mathematically related and can be constructed by at least three distinct methods.

The following is the equation of the curved grooves:

$$R = \frac{C}{\sine\left(\frac{A}{2N}\right)}$$

or $$R = \frac{C}{\sqrt{\frac{1-\cos\left(\frac{A}{N}\right)}{2}}}$$

In this equation,
R denotes the radius or slide setting (a variable).
C denotes a constant.
A denotes any angle.
N denotes the number of the curve used.
Sine denotes the sine and cos denotes the cosine.

What I claim is:

1. A measuring instrument including a sector shaped plate provided with a series of curves and a basic straight line so formed as to be spaced from each other equal chord distances throughout all radius distances from the apex of the plate, a radius arm pivotally connected with said plate at the apex of the plate for movement over the same, a longitudinally adjustable slide on the radius arm, a pointer on the slide to cooperate with the series of curves, means for holding the slide in different positions of adjustment on the radius arm, and an arm movably mounted for independent positioning with reference to the plate and for fixing the same to the radius arm for movement therewith as an entity with reference to the plate.

2. A measuring instrument including a sector shaped plate provided with a series of curves and a basic straight line so formed as to be spaced from each other equal chord distances throughout all radius distances from the apex of the plate, a radius arm pivotally connected with said plate at the apex of the plate for movement over the same, a longitudinally adjustable slide on the radius arm, a pointer on the slide to cooperate with the series of curves, a stop on the radius arm for the slide, and an arm movably mounted for independent positioning with reference to the plate and for fixing the same to the radius arm for movement therewith as an entity with reference to the plate.

3. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a rule member pivotally connected to the sector shaped plate at the apex of the plate to swing about the same pivotal axis as the radius arm, the pivotal connections of the radius arm and rule member with the plate having aligned central openings, and the plate being provided with an opening through the same in alignment with said openings, and a needle member adapted to be inserted through said openings.

4. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a rule member pivotally connected to the sector shaped plate at the apex of the plate to swing about the same pivotal axis as the radius arm, the pivotal connections of the radius arm and the rule member with the plate including a tubular stud on the plate, said plate having an opening in alignment with the opening of said stud, and a needle member adapted to slidably fit within the tubular stud.

5. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a rule member pivotally connected to the sector shaped plate at the apex of the plate to swing about the same pivotal axis as the radius arm, and means for connecting the rule member to the radius arm for movement therewith.

6. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a scale on the radius arm to cooperate with said slide, and an arm pivotally connected with the plate at the apex of the plate for independent positioning with reference to the plate and for fixing the same to the radius arm for movement therewith as an entity with reference to the plate.

7. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a rule member pivotally connected to the sector shaped plate at the apex of the plate to swing about the same pivotal axis as the radius arm, a slide on the rule member, and a marking element on said slide.

8. A measuring instrument including a sector shaped plate provided with a series of curved grooves, a radius arm pivotally connected with said plate at the apex of the plate for movement over the same, a longitudinally adjustable slide on the radius arm, a needle on the slide adapted to be engaged with and to slide in the series of curved grooves, and an arm movably mounted for independent positioning with reference to the plate and for fixing the same to the radius arm for movement therewith as an entity with reference to the plate.

9. A measuring instrument including a sector shaped plate provided with a series of curves, a stud on the plate at the apex thereof, a radius arm pivotally mounted on said stud for movement over the plate, a longitudinally adjustable slide on the radius arm, a pointer on the slide to cooperate with the series of curves, and a rule member pivotally mounted on said stud to swing about the same pivotal axis as the radius arm.

10. A measuring instrument including a sector shaped plate provided with a series of curves, a stud on the plate at the apex thereof, a rule member provided with a sleeve portion to engage the stud and provide therewith a pivotal connection of said member with the plate, said sleeve portion having a laterally extending flange at its lower end, a radius arm provided with an apertured portion to pivotally engage said sleeve portion, means for clamping the apertured portion of the radius arm against the flange of the sleeve portion, a longitudinally adjustable slide on the radius arm, and a pointer on the slide to cooperate with the series of curves.

11. A measuring instrument including a sector shaped plate provided with a series of curves, a tubular stud on the plate at the apex thereof, a radius arm pivotally mounted on the stud for movement over the plate, a longitudinally adjustable slide on the radius arm, a pointer on the slide to cooperate with the series of curves, a rule member pivotally mounted on said stud to swing about the same pivotal axis as the radius arm, said plate having an opening in alignment with the opening of the tubular stud, and a needle member adapted to slidably fit within the tubular stud.

12. A measuring instrument including a sector shaped plate provided with a series of curves, a radius arm pivotally connected with said plate at the apex of the plate for movement over the same, a longitudinally adjustable slide on the radius arm, a pointer on the slide to cooperate with the series of curves, a rule member pivotally connected to the sector shaped plate at the apex of the plate to swing about the same pivotal axis as the radius arm, a slide on the rule member, resilient means on the rule slide engaging the rule member to yieldably maintain the slide in different positions of adjustment, and a marking element on said slide.

13. In a measuring instrument, the combination of a plate bearing a series of curves and a basic straight line so formed as to be spaced from each other equal chord distances throughout all radius distances from a point on the plate lying within a continuation of the straight line, a radius arm pivotally connected with said plate for adjustment over the same with reference to said curves, and an arm movably mounted for independent positioning with reference to the plate and for fixing the same to the radius arm for movement therewith as an entity with reference to said plate.

14. In a measuring instrument, the combination of a sector shaped plate bearing a series of curves and a basic straight line so formed as to be spaced from each other equal chord distances throughout all radius distances from the apex of the plate, a radius arm pivotally connected with said plate at the apex of the plate for adjustment over the same, a longitudinally adjustable slide on the radius arm, a pointer on the slide to cooperate with the series of curves, and an arm pivotally connected with the plate at the apex of the plate for independent positioning with reference to the plate and for fixing the same to the radius arm for movement therewith as an entity with reference to said plate.

15. In a measuring instrument, the combination of a sector shaped plate bearing a series of curves and a basic straight line, the latter extending radially of the plate, the curves and the straight line being spaced from each other equal chord distances from the apex of the plate throughout all radius distances, a radius arm pivotally connected with said plate at the apex of the plate for adjustment over the same, a longitudinally adjustable slide on the radius arm, a pointer on the slide to cooperate with the series of curves and straight line, and an arm movably mounted for independent positioning with reference to the plate and for fixing the same to the radius arm for movement therewith as an entity with reference to said plate.

16. A measuring instrument including a sector shaped plate provided with a series of curved grooves and a basic straight groove, the latter extending radially of the plate, said grooves being spaced from each other equal chord distances throughout all radius distances from the apex of the plate, a radius arm pivotally connected with said plate at the apex of the plate for movement over the same, a longitudinally adjustable slide on the radius arm, a pointer on the slide to be engaged with and slide in said grooves, and an arm movably mounted for independent positioning with reference to the plate and for fixing the same to the radius arm for movement therewith as an entity with reference to said plate.

17. In a measuring instrument, the combination of a plate bearing a series of curves and a basic straight line spaced from each other equal chord distances throughout all radius distances from a central point lying within a continuation of the basic straight line, the locus or path of the first of the series of curves next to the basic straight line being formed by the upper end of a chord of fixed length moving outwardly from some point near said central point with its lower end terminating continuously in and moving along the basic straight line, the radial distance of the upper end of said outwardly moving chord from said central point being always the same as that of the radial distance of the lower end of said chord from said point, and each of the other curves of the series in succession being similarly derived from its predecessor, and correlated indicating instrumentalities pivotally connected with said plate at said central point for independent preliminary positioning with reference to said plate and means for fixing said correlated instrumentalities together for movement as an entity with reference to said plate.

ELI J. YARTER.